United States Patent [19]

Schulz

[11] 4,279,003
[45] Jul. 14, 1981

[54] PICTURE CONTRAST-INCREASING ARRANGEMENTS

[75] Inventor: Joachim Schulz, Mönkeberg, Fed. Rep. of Germany

[73] Assignee: Dr. Ing Rudolf Hell G.m.b.H., Monkeberg, Fed. Rep. of Germany

[21] Appl. No.: 8,585

[22] Filed: Feb. 1, 1979

[30] Foreign Application Priority Data

Feb. 8, 1978 [DE] Fed. Rep. of Germany ....... 2805237

[51] Int. Cl.³ .............................................. H04N 1/40
[52] U.S. Cl. ................................................. 358/280
[58] Field of Search .................... 358/75, 80, 280, 284

[56] References Cited

U.S. PATENT DOCUMENTS

| 2,892,887 | 6/1959 | Hell | 358/283 |
| 2,962,548 | 11/1960 | Taudt | 358/284 |
| 3,197,939 | 7/1965 | Ernst | 358/75 |
| 3,887,939 | 6/1975 | Hunt | 358/75 |

Primary Examiner—Joseph A. Orsino, Jr.
Attorney, Agent, or Firm—Brisebois & Kruger

[57] ABSTRACT

Contrast is increased when reproducing originals, by using a first correcting signal for continuous-tone areas in the original and a second correcting signal which affects only line elements (narrow lines) in it. To generate a picture signal and a surrounding-area signal, an opto-electronic scanning member having a picture-point aperture and a surrounding-area aperture is provided. The diameter of the picture-point aperture is approximately equal to the width of the line elements in the original which are to be corrected.

The first correcting signal is obtained from the picture signal and the surrounding area signal in a difference stage, and a selectable proportion of it is superimposed on the picture signal to increase sharpness.

The difference stage is followed by a threshold circuit which allows positive parts of the first correcting signal lying above a first threshold and negative parts of the first correcting signal lying below a second threshold value to pass through, the parts which are allowed to pass through being superimposed on the picture signal as a second correcting signal, to increase sharpness for line elements.

With the arrangement, the reproduction of line elements can be optimized and the increase of contrast in continuous-tone areas can be selected so that no unsightly seams occur at jumps in tonal values.

6 Claims, 2 Drawing Figures

PICTURE CONTRAST-INCREASING ARRANGEMENTS

BACKGROUND OF THE INVENTION

The present invention relates to arrangements for increasing contrast when reproducing originals containing line elements dot by dot and line by line of the kind, comprising an opto-electronic scanning member having a picture-point aperture and a surrounding-area aperture to allow a picture signal and a surrounding-area signal to be obtained, a difference stage to which the picture and surrounding-area signals are applied to generate a correcting signal, and means to act on the correcting signal before it is superimposed on the picture signal. Hereinafter such arrangements will be referred to as "of the kind described".

Arrangements according to the invention may be applied to electronic reproducing apparatus such as engraving machines and scanners.

In such apparatus, an original is scanned point by point and line by line by an opto-electronic scanning member and the picture signal so obtained is corrected to suit the demands of the reproduction process. The corrected picture signal controls a reproducing member which is responsible for reproducing the original on a reproduction medium. The reproducing member is for example an electromagnetic engraving member for doing physical work on material or an exposing lamp for exposing films.

The original to be reproduced may contain contain continuous tone pictures and line elements belonging to characters and graphic representations.

The reproduction of very finely detailed line elements, such as occur for example in some foreign characters, presents considerable problems.

The original is produced photo-graphically and even at this stage the enlargement or copying causes a reduction in contrast in comparison with the original artwork, particularly in fine details, due to the unsharpness in the film layers.

It is for example difficult to produce black line elements whose density is the same as that of large black areas and nominally white areas lying between closely adjacent line elements become grey when they appear in the photographic original.

Thus, when the original is scanned in the reproducing apparatus, picture signals occur whose amplitudes deviate from the correct levels and the screen dots or tonal values which are reproduced from them become falsified.

Added to this is the fact that the resolution of the scanning member is restricted by light scatter and the aberrations of objective lenses. As a result a further reduction in contrast as compared with the original occurs in the reproduction process, which the human eye perceives as unsharpness in the reproduction.

To restore contrast or sharpness in the reproduction, it is known, from U.S. Pat. No. 2,691,696 for example, to use a process similar to the unsharp masking used in photographic reproduction and to scan not only the actual picture point, using a picture joint aperture, but also its immediate vicinity (surrounding area) using a surrounding-area aperture. The additional surrounding-area signal which is obtained in this way, which is proportional to the mean brightness of the surrounding-area, is subtracted from the picture signal to produce a correcting signal. A selectable proportion of the correcting signal, whose amplitude is dependant on the jump in tonal value in the original, is superimposed on the picture signal.

This measure results in an increase in detail contrast or sharpness at jumps in tonal value since in the immediate vicinity of a jump in tonal value a dark detail is reproduced darker and a light detail lighter than at some distance from the jump in tonal value. In this case the range covered by the correction at a jump in tonal value can be varied by varying the diameter of the surrouding-area aperture.

This known arrangement is not suitable for raising contrast selectively for line elements. As already mentioned, the picture signal levels which occur when scanning line elements are low and as a result so too are the correcting signal amplitudes. If the desired effect is in fact to be achieved for line elements with the known arrangement, the correcting signal available must be superimposed on the picture signal at its full value.

However, since in the conventional arrangement the correcting signal acts in the same way in both continuous-tone and line areas of the original, when there are jumps in density in continuous tone areas unsightly seams occur, which must be considered very much of a disadvantage.

It is therefore an object of the invention to overcome or at least minimise the disadvantages referred to and to provide an arrangement for making a selective increase in contrast or sharpness for line elements, without continuous-tone areas being disfigured.

SUMMARY OF THE INVENTION

Accordingly, in an arrangement for increasing contrast when reproducing originals containing line elements dot by dot and line by line of the kind, comprising an opto-electronic scanning member having a picture-point aperture and a surrounding-area aperture to allow a picture signal and a surrounding-area signal to be obtained, a difference stage to which the picture and surrounding-area signals are applied to generate a correcting signal, and means to act on the correcting signal before it is superimposed on the picture signal, the invention consists in that the diameter of said picture-point aperture is selected to be approximately the same as the width of the particular line elements which are to be corrected, and in that, to generate a selective correcting signal for the line elements, said difference stage is followed by a threshold circuit which allows positive parts of said correcting signal lying above a first threshold and negative parts of said correcting signal lying below a second threshold to pass through, the parts of said correcting signal which are allowed to pass through being superimposed on said picture signal to increase contrast for line elements.

BRIEF DESCRIPTION OF THE DRAWINGS

In order that the invention may be more clearly understood, reference will now be made to the accompanying drawings which show one embodiment thereof by way of example and in which.

DETAILED DESCRIPTION OF THE PREFERRED EMBODIMENT

Figure 1:
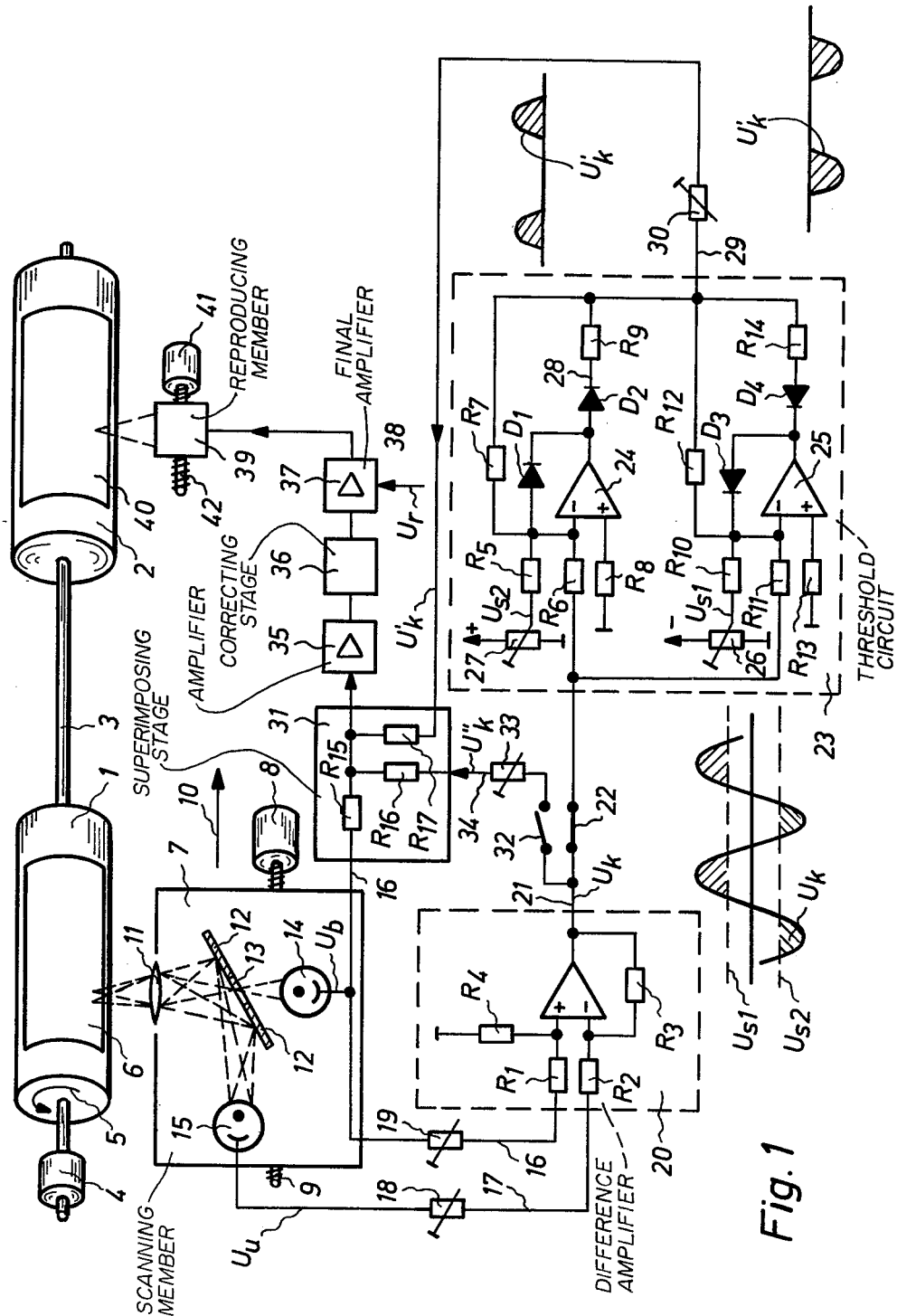
FIG. 1 is a general block circuit diagram of a reproducing apparatus having an arrangement for the selective improvement of contrast.

Referring now the drawings, FIG. 1 is a general block circuit diagram of a reproducing apparatus having an arrangement for increasing contrast selectively.

In this figure, a scanning drum 1 and a reproducing drum 2 are shown coupled together mechanically by a shaft 3 and are driven in common by a motor 4 in the direction of an arrow 5. Mounted on the scanning drum 1 is an original 6 which may contain continuous-tone pictures and line elements.

The original 6 is scanned point by point and line by line by a spot of light from a light source which is not shown. Having been reflected by an opaque original or transmitted by a transparent original, the scanning light, modulated by the information contained in the original, passes to a scanning member 7. The scanning member 7 can be moved parallel to scanning drum 1 in the direction of an arrow 10 by means of a motor 8 and a spindle 9.

Arranged in the beam path of an objective 11 in the scanning member is an annular mirror which represents a surrounding-area aperture 12, while the opening in the centre of the mirror forms a picture point aperture 13.

In accordance with the invention, the diameter of the picture point aperture 13 is selected to be approximately equal to the width of the line elements which are to receive preferential correction, being for example 0.1 mm. It has proved advantageous for the diameter of the surrounding-area aperture 12 to be three times larger.

The scanning light from the centre of the picture point being scanned at any given time passes through the picture point aperture 13 to a first opto-electronic transducer 14 and is there converted into a picture signal $U_b$. The amount of light from the area surrounding the picture point, which is reflected by the surrounding-area aperture 12, impinges on a second opto-electronic transducer 15 in which the surrounding-area signal $U_u$ is generated.

The picture signal $U_b$ on a line 16 and the surrounding area signal $U_u$ on a line 17 are fed via potentiometers 18 and 19 to a difference amplifier 20 in which the surrounding area signal $U_u$ is subtracted from the picture signal $U_b$ to produce a correcting signal $U_k$.

By means of potentiometers 18 and 19 the signals are so adjusted relative to one another that when an area of constant tonal value in the original which is larger than the area of the original covered by the surrounding-area aperture 12 is scanned, the correcting signal $U_k$ is zero.

The correcting signal $U_k$ is fed via a line 21 and a switch 22 to a threshold circuit 23 which allows positive parts of the correcting signal $U_k$ lying above a first threshold value $U_{s1}$ and negative parts of the correcting signal lying below a second threshold value $U_{s2}$ to pass through to form a selective correcting signal $U'_k$ for line elements.

The threshold circuit 23, which is also referred to as an amplitude filter, comprises in essence two operational amplifiers 24 and 25 having gains $G=-1$ which are connected to form half-wave rectifiers.

The first and second threshold values $U_{s1}$ and $U_{s2}$ are set at potentiometers 26 and 27 independently of one another.

At the inverting input of operational amplifier 24 the threshold value $U_{s2}$ and the correcting signal $U_k$ are added via resistors $R_5$ and $R_6$. If the sum is positive, diode $D_1$ conducts. The amplification G by operational amplifier 24 and the output signal on a line 28 are zero. If one the other hand the sum is negative, diode $D_1$ blocks and the feedback loop containing a diode $D_2$ and a resistor $R_7$ comes into action. The operational amplifier 24 then has a gain G of $-1$ and the output signal from it corresponds to the proportion of the correcting signal $U_k$ lying beneath the threshold value $U_{s2}$.

With the appropriate changes, the same applies to operational amplifier 25.

The correcting signal $U'_k$ at the output of circuit 23 is fed via line 29 and a further potentiometer 30 to a superimposing stage 31 containing decoupling resistors $R_{15}$, $R_{16}$, and $R_{17}$ which is arranged in the signal path of the picture signal $U_b$, and it is there superimposed on the picture signal $U_b$ by addition. The superimposition could also take place in some other way, e.g. by multiplication.

It is advantageous for a selectable proportion $U''_k$ of the correcting signal $U_k$ from the output of difference amplifier 20 also to be superimposed on the picture signal in the superimposing stage 31. For this purpose, the difference amplifier 20 is connected to the superimposing stage 31 via a switch 32, a potentiometer 33 and a line 34.

Having been modified in the superimposing stage 31 for the purposes of increasing contrast, the picture signal $U_b$ passes via an amplifier 35 to a further correcting stage 36 in which the picture signal $U_b$ undergoes a further modification, for example gradation matching, to meet the requirements of the reproduction process. Such correcting circuits are for example known from U.S. Pat. No. 3,885,244.

To generate a printing screen, a screen signal $U_r$ on a line 38 is superimposed on the modified picture signal $U_b$ in a final amplifier 37. The output signal from the final amplifier 37 controls a reproducing member 39 which is responsible for reproducing the original 6 dot by dot and line by line on a reproduction medium 40. The reproduction medium 40 is mounted on the rotating reproducing drum 2.

The reproducing member 39 is moved parallel to the reproducing drum 2 in the direction of arrow 10 by means of a further motor 41 and a spindle 42.

If the reproducing arrangement described is an engraving apparatus, the reproducing member 39 is for example an electromagnetic engraving member having an engraving tool to form a cutter for the screen dots or else it may be an energy-beam generator, in which case the screen dots are formed by the evaporation of material.

If on the other hand it is scanner, the reproducing member 39 is a light source whose brightness is modulated by the output signal from the final amplifier 37 and which produces a screened or unscreened reproduction on film material.

The invention may of course also be applied to colour scanners and flat-bed reproducing apparatus.

Figure 2:
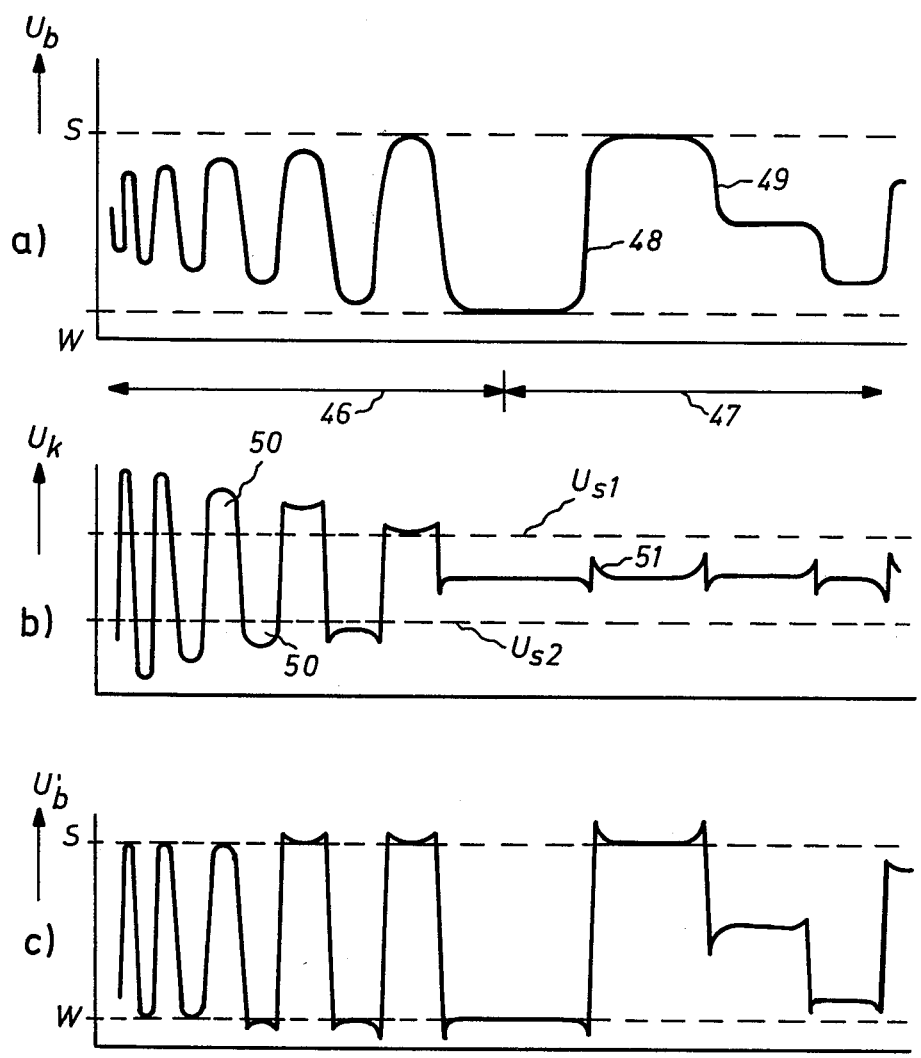
FIG. 2 is a set of diagrams.

The way in which the circuit arrangement for increasing contrast operates will now be explained in detail with reference to the diagrams in FIG. 2.

(a) shows the waveform of picture signal $U_b$ along a scanning line, where a line area 46 of the original 6 is scanned, followed by a continuous-tone area 47.

It is assumed that the line area 46 contains alternating black and white line elements orientated transversely to the line direction, after the fashion of a striped pattern. The thickness of the lines is assumed to increase from left to right. The continuous-tone area 47 is assumed to contain a full jump in density 48 from "black" to "white" and a smaller jump in density 49 from "black" to "grey".

The levels which the picture signal $U_b$ should reach are shown on the y axis as "S" and "W".

Because of the shortcomings of the original and scanning member which are mentioned in the introduction to the specification, the picture signal fails to reach the correct required levels, particularly with very fine lines.

At (b) is shown the correcting signal $U_k$ at the output of difference amplifier 20 in FIG. 1.

By virtue of the fact that, in the embodiment, the diameter of the picture point aperture 13 is selected to be approximately the same as the minimum line thickness, which lies at the limit of the resolving power of the scanning member 7, the amplitude of the correcting signal $U_k$ is a maximum when such line elements are scanned and decreases as the line-thickness increases. In all cases the amplitudes of the correcting signal $U_k$ in the line area 46 are higher than in the continuous tone area 47.

If the threshold values $U_{s1}$ and $U_{s2}$ are higher than, i.e. above and below, the maximum signal amplitudes in the continuous-tone area 47, the correcting signal $U'_k$ at the output of threshold circuit 23 of FIG. 1 is zero when the continuous-tone area 47 is scanned and only comes into action in the line area 46, as dictated by the settings of the potentiometers.

Also shown in (b) are the threshold values $U_{s1}$ and $U_{s2}$. The parts 50 of the signal lying above and below the threshold values form the correcting signal $U'_k$ for the line area 46, while the parts 51 form the correcting signal $U''_k$ and can be used selectively for increasing contrast in the continuous-tone area 47.

(c) shows the corrected picture signal $U_b$ at the output of the superimposing stage 31 of FIG. 1. As can be seen, the amplitude deficiencies in the picture signal $U_b$ can be compensated for by a selective metering in of the correcting signal $U'_k$ which applies only to line elements. However, a selective increase in contrast can be made at the same time in the continuous tone area 47. Means are therefore available on the one hand of optimising the reproduction of line elements and on the other hand of selecting the increase in contrast in the continuous-tone area in such a way that no unsightly seams occur at jumps in tonal value.

It should also be mentioned that in certain cases it may be beneficial with the arrangement according to the invention to over-correct the picture signal amplitudes from fine line elements in order for example to compensate for the low-pass characteristics of electromagnetic engraving members.

I claim:

1. In an arrangement for increasing contrast when reproducing originals containing line elements, comprising
   (a) an opto-electronic scanning member having a main aperture and an unsharp masking aperture respectively operative to generate a picture signal and an unsharp masking signal, the diameter of said main aperture being approximately equal to the width of the line elements in said original,
   (b) a difference stage operatively connected to said scanning member to generate a difference signal from said picture signal and said unsharp masking signal,
   (c) a threshold circuit operatively connected to said difference stage, which allows positive parts of said difference signal lying above a first threshold value and negative parts lying below a second threshold value to pass through, and
   (d) means for superimposing selectable proportions of said parts of the difference signal which have been passed by said threshold circuit onto said picture signal as a first correcting signal to increase contrast for line elements in said original.

2. An arrangement according to claim 1, wherein said threshold values are separately adjustable.

3. An arrangement according to claim 1, wherein switches are provided by means of which said correcting signals can be switched out.

4. An arrangement according to claim 1, wherein the ratio between the diameters of said main aperture and said unsharp masking aperture is selected to be between 1:2 and 1:5.

5. An arrangement according to claim 4, wherein said ratio is selected to be 1:3.

6. In an arrangement for increasing contrast when reproducing originals containing line elements and continuous tone areas, comprising:
   (a) an opto-electronic scanning member having a main aperture and an unsharp masking aperture respectively operative to generate a picture signal and an unsharp masking signal, the diameter of said main aperture being approximately equal to the width of the line elements in said original,
   (b) a difference stage operatively connected to said scanning member to generate a difference signal from said picture signal and said unsharp masking signal,
   (c) a threshold circuit operatively connected to said difference state, which allows positive parts of said difference signal lying above a first threshold value and negative parts lying below a second threshold value to pass through,
   (d) means for superimposing selected parts of the difference signal which have been passed by said threshold circuit onto said picture signal as a first correcting signal to increase contrast for line elements in said original, and
   (e) means for superimposing selected parts of the difference signal which have not been passed by said threshold circuit onto said picture signal as a second correcting signal in order to increase contrast in continuous tone areas.

* * * * *